United States Patent

Mielke et al.

[11] Patent Number: 5,575,249
[45] Date of Patent: Nov. 19, 1996

[54] PLASTIC INTAKE MANIFOLD ASSEMBLY WITH HOLLOW RESONANCE CHAMBER STRUCTURE FOR INTERNAL COMBUSTION ENGINES

[75] Inventors: Josef Mielke, Schwieberdingen; Herbert Pietrowski, Steinheim, both of Germany

[73] Assignee: Filterwerk Mann & Hummel GmbH, Ludwigsburg, Germany

[21] Appl. No.: 546,034

[22] Filed: Oct. 20, 1995

[30] Foreign Application Priority Data

Oct. 21, 1994 [DE] Germany .......................... 44 37 677.4

[51] Int. Cl.⁶ ............................ B29C 65/06; B29D 23/24; F02M 35/10
[52] U.S. Cl. .................. 123/184.57; 123/184.61
[58] Field of Search ......................... 123/184.57, 184.61, 123/184.21, 184.47

[56] References Cited

U.S. PATENT DOCUMENTS 4,776,313  10/1988  Freismuth et al. ................ 123/184.61
5,243,933   9/1993  Mukawa ............................ 123/184.61
5,490,484   2/1996  Rutschmann ....................... 123/184.57

FOREIGN PATENT DOCUMENTS

WO92/12845  8/1992  WIPO.

*Primary Examiner*—Marguerite McMahon
*Attorney, Agent, or Firm*—Evenson, McKeown, Edwards & Lenahan P.L.L.C.

[57] ABSTRACT

A plastic intake manifold assembly for an internal combustion engine, and a method for its production. The assembly is in the form of a hollow plastic structure composed of two housing pieces in which a resonance chamber cross section is formed by means of an insert in the housing interior. Mating surfaces on the housing pieces are bonded together, for example by friction welding or ultrasonic welding. The invention has the advantage that by using inserts of differing size, resonance chambers of different sizes can be produced without altering or modifying the housing pieces.

14 Claims, 4 Drawing Sheets

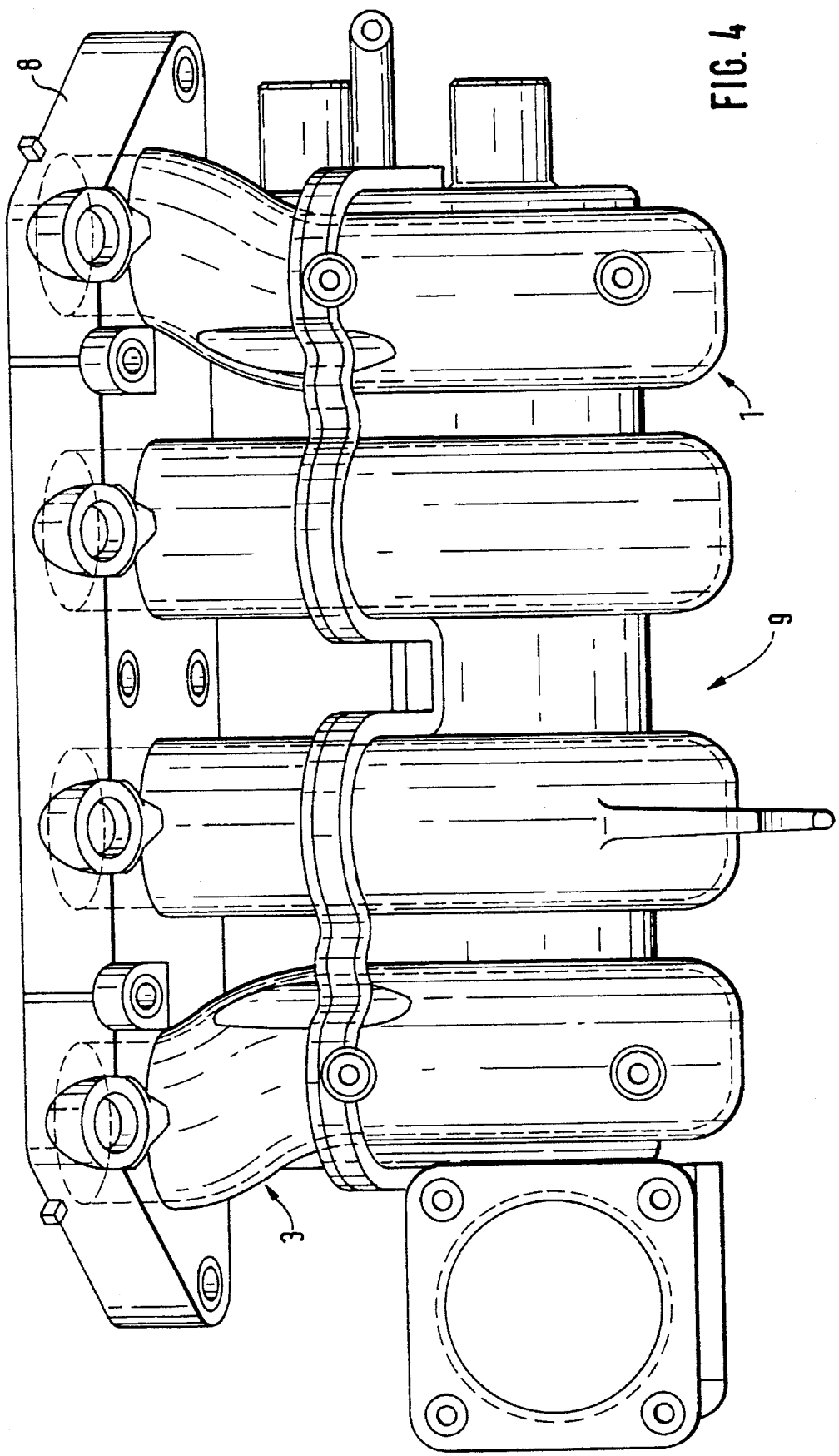

5,575,249

PLASTIC INTAKE MANIFOLD ASSEMBLY WITH HOLLOW RESONANCE CHAMBER STRUCTURE FOR INTERNAL COMBUSTION ENGINES

BACKGROUND OF THE INVENTION

The invention relates to a method for the production of assembled hollow plastic structures from at least two housing pieces with corresponding sealing surfaces and at least one insert piece with corresponding sealing surfaces in order to create a reverberation chamber or resonance chamber cross section lying in the hollow chamber, in conjunction with the first or second housing piece.

The invention furthermore relates to an assembled hollow structure which comprises at least two housing pieces with corresponding sealing surfaces and at least one insert piece with corresponding sealing surfaces for producing a reverberation chamber cross section in the interior of the housing in conjunction with the first or second housing piece.

Parr et al., published PCT patent application no. WO 92/12 845, discloses a plastic intake manifold assembly and a method for its production. If it is desired to use such a chamber structure as an intake manifold on an internal combustion engine, it is a disadvantage thereof that, if it is desired to make changes in the operating parameters, the reverberation chamber cross section and length are fixed. To produce a different geometry, new tooling would have to be constructed. It might be possible to provide additional external enclosures to correspond to the resonator cross section. This, however, is expensive to manufacture, on the one hand, and the chamber structure would therefore be more expensive. On the other hand, this would also increase the size of the chamber structure and increase the stress, for example, on the flange connection.

SUMMARY OF THE INVENTION

It is thus the object of the invention to provide an improved method for producing an assembled hollow plastic chamber structure.

Another object of the invention is to provide a flexible method which can be used to produce assembled hollow plastic chamber structures of varying size without retooling.

A further object of the invention is to provide a method of producing a hollow plastic structure which is both inexpensive to carry out and highly reliable.

It is also an object of the invention to provide a plastic intake manifold assembly with a hollow resonance chamber structure which can be readily adapted to obtain resonance chamber structures of different cross section and/or length without modifying the basic housing pieces.

These and other objects have been achieved in accordance with the present invention by providing a method for producing a plastic intake manifold assembly with a hollow resonance chamber structure, the method comprising the steps of providing a first plastic housing piece having a first sealing surface; providing a second plastic housing piece having a second sealing surface; providing at least one plastic insert piece having a sealing surface mating with at least one of the first and second housing pieces; mounting the first housing piece in a first tool which supports the first housing piece in the vicinity of the first sealing surface; mounting the second housing piece in a second tool which support the second housing piece in the vicinity of the second sealing surface; inserting the at least one insert piece into one of the first and second housing pieces so as to form a resonance chamber cross section; aligning the first and second tools with the first and second housing pieces such that the first and second sealing surfaces matingly engage each other, and bonding the mating sealing surfaces to each other.

In accordance with a further aspect of the invention, the objects are also achieved by providing a plastic intake manifold assembly with a hollow resonance chamber structure comprising first and second plastic housing pieces with mating sealing surfaces bonded to each other to form a housing, and at least one plastic insert piece inserted in one of the first and second housing pieces, the insert piece having a sealing surface mating with the one of the first and second housing pieces to form a resonance chamber cross section interiorly of the housing.

Thus, the invention relates to a method comprising the following steps:

creation of a first plastic housing piece with a first sealing surface;

creation of a second plastic housing piece with a second sealing surface;

creation of at least one insert piece with sealing surface;

mounting of the first plastic housing piece in a first tool or jig which supports the first plastic housing piece in the vicinity of the first sealing surface;

mounting of the second plastic housing piece in a second tool or jig which supports the second plastic housing piece in the vicinity of the second sealing surface;

insertion of one or more of the inserts into the first or second plastic housing piece so that a resonance chamber cross section is created;

alignment of the parts with the corresponding sealing surfaces so that the corresponding sealing surfaces come in contact with one another; and application of a bonding force to all of the sealing surfaces.

If, in the case of an existing motor/intake manifold combination, there is a need for a different torque-to-power ratio, usually both the resonance chamber length and the diameter are changed.

The use of so-called "insert pieces" obviates the need for producing new tooling, and the same tools or jigs are used for the plastic housing pieces. The manufacturing process carried out in this manner is extremely flexible and can be used economically even for small production runs. The compact construction results in lower stresses on the flanged components.

Advantageous preferred embodiments are described in the following.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIG. 4 is a view seen in the direction of arrow X in FIG. 2.

DETAILED DESCRIPTION OF PREFERRED EMBODIMENTS

Figure 1:
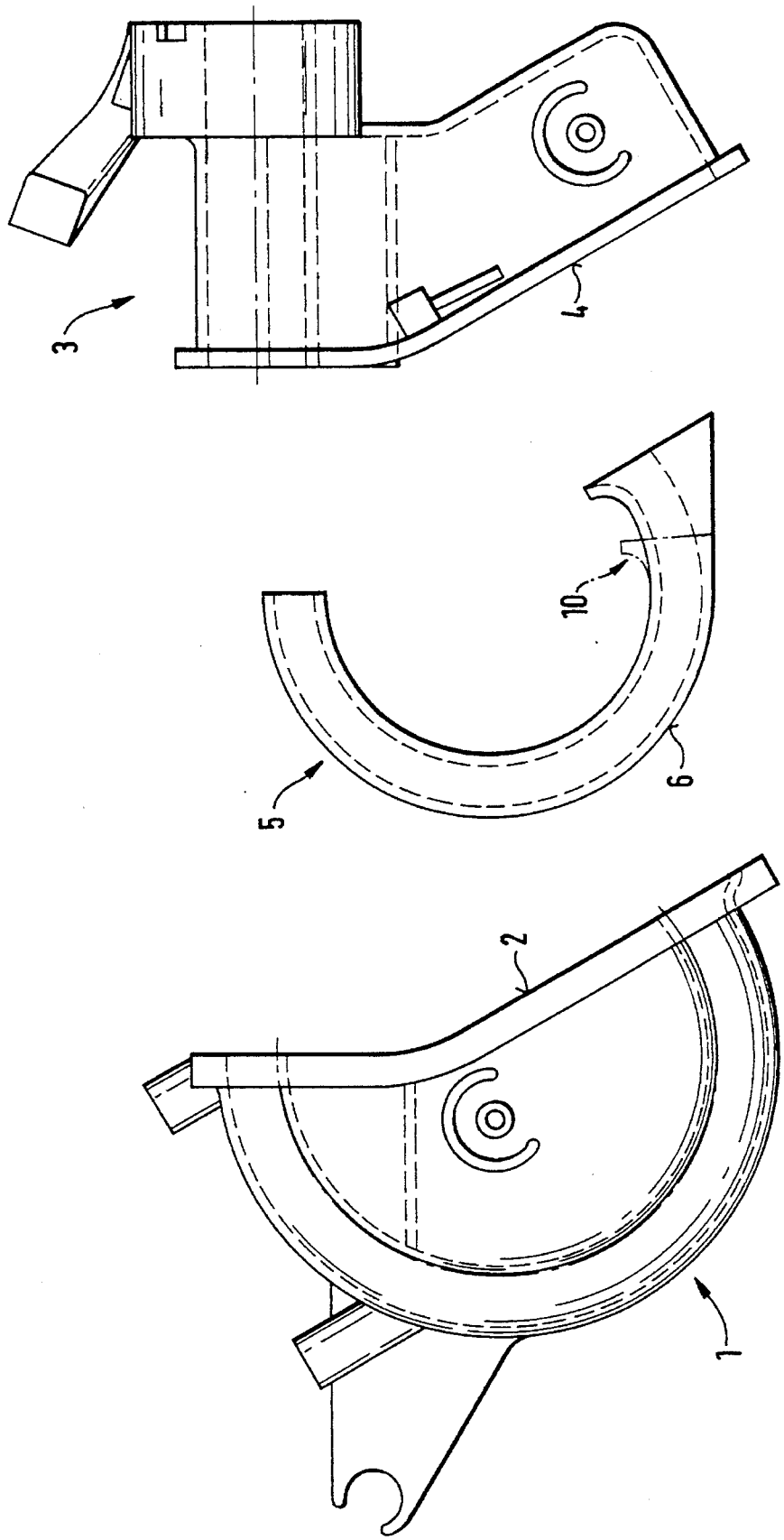
FIG. 1 is an exploded representation of one preferred embodiment.

FIG. 1 shows an exploded view of the plastic hollow chamber structure, comprising plastic housing piece 1, sealing surface 2, insert part 5 with corresponding sealing surface 6, and plastic housing piece 3 with sealing surface 4 which corresponds to and is adapted to mate with sealing surface 2. In this working embodiment, insert 5 is clipped into the plastic housing piece 1, so that sealing surface 6 produces with the inside of plastic housing piece 1 a gastight resonance chamber 7 (FIG. 3).

Figure 2:
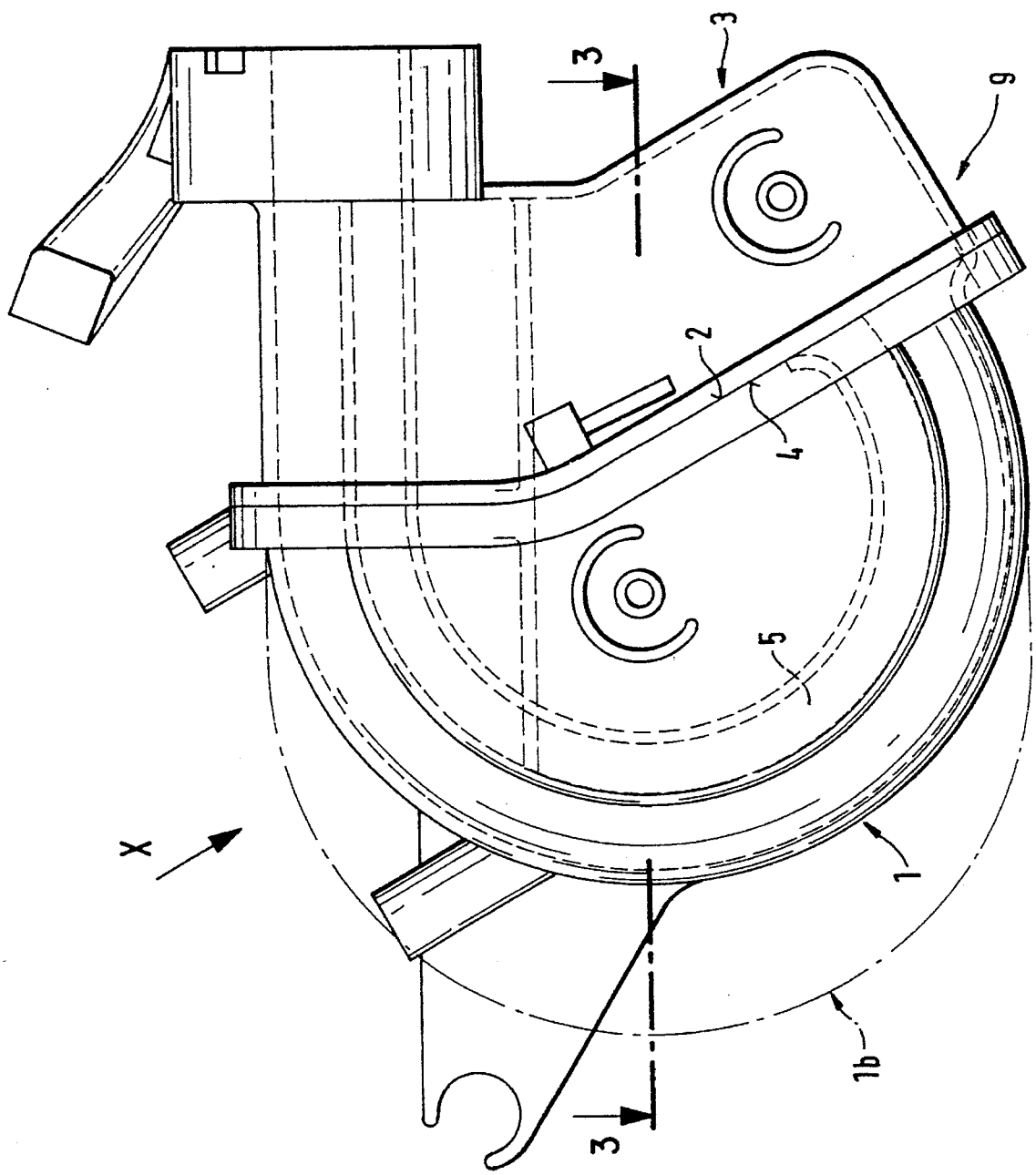
FIG. 2 is a side view of a preferred embodiment.

FIG. 4 shows a view seen in the direction of arrow X of FIG. 2. In FIG. 4, the hollow chamber structure or manifold assembly 9 is shown together with its associated mounting flange 8.

Figure 3:
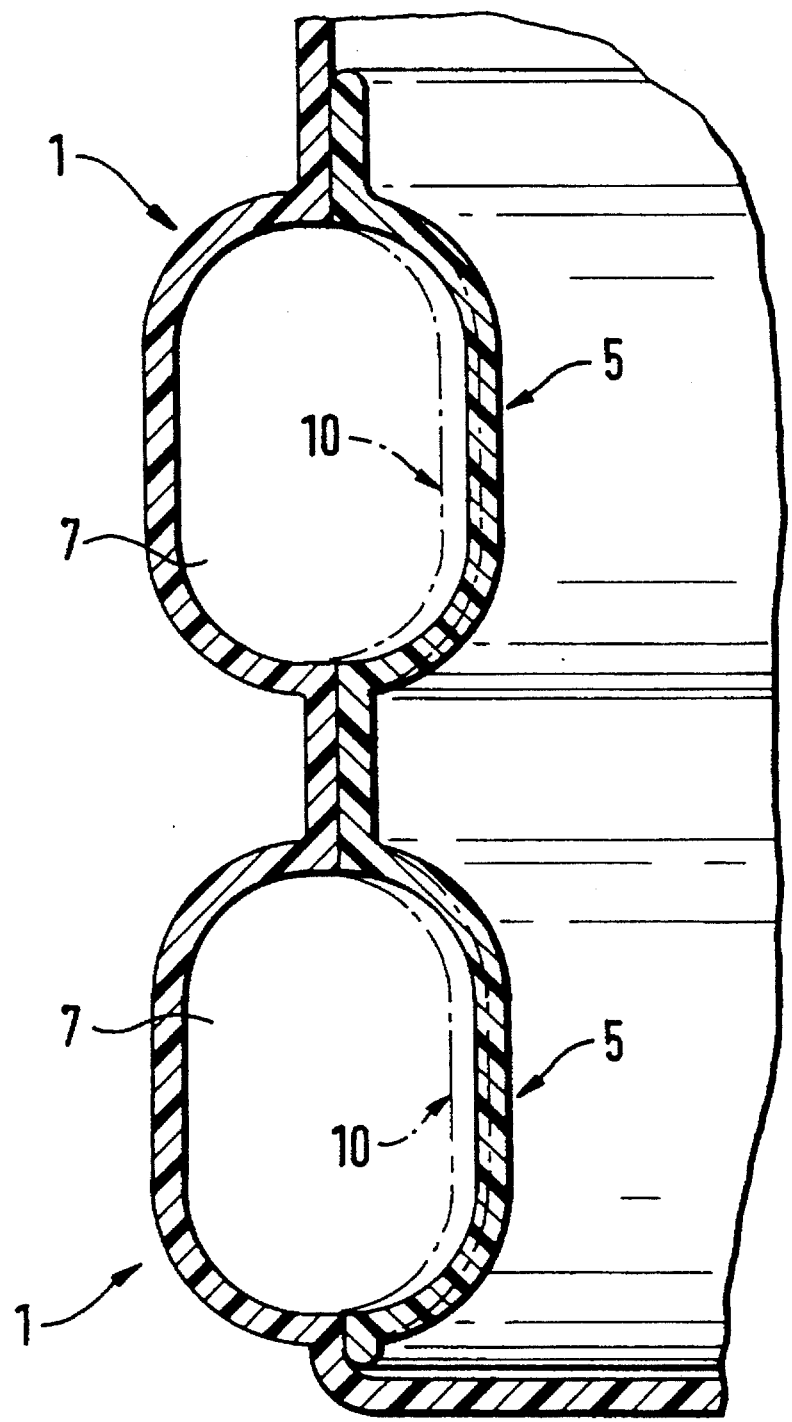
FIG. 3 is a sectional view taken along line A—A in FIG. 2.

FIG. 3 is a sectional view taken along line A—A of FIG. 2. In FIG. 3 it can be seen how different resonance chamber cross sections can be produced with different inserts 5, even though the housing pieces 1 and 3 remain the same. The schematically indicated insert 10 enables one to obtain a smaller resonance chamber cross section.

FIG. 1 shows how various induction tube lengths can be obtained with various inserts 5 without changing the housing pieces 1 and 3. The schematically illustrated insert 10 represents a shorter induction tube length.

FIG. 2 shows schematically how merely by varying the housing insert 1b, a modified resonance chamber length can be obtained.

First housing piece 1 and second housing piece 3 are bonded together to form housing structure 9. This may be achieved by moving the tool or jig in which one of the housing pieces is mounted relative to the tool or jig in which the other of the housing pieces is mounted in order to produce friction between the mating sealing surfaces 2 and 4 of the housing pieces and friction weld the housing pieces to each other. Alternatively, the housing pieces may be bonded to each other by application of high pressure or by application of high frequency energy, such as ultrasonic energy or microwave energy, in order to fuse the mating sealing surfaces to each other. If desired, similar techniques may be used to join the insert piece to the housing piece in which it is received.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an plastic intake manifold assembly with a hollow resonance chamber structure, said method comprising the steps of:

providing a first plastic housing piece having a first sealing surface;

providing a second plastic housing piece having a second sealing surface;

providing at least one plastic insert piece having a sealing surface mating with at least one of said first and second housing pieces;

mounting the first housing piece in a first tool which supports the first housing piece in the vicinity of the first sealing surface;

mounting the second housing piece in a second tool which support the second housing piece in the vicinity of the second sealing surface;

inserting the at least one insert piece into one of the first and second housing pieces so as to form a resonance chamber cross section;

aligning said first and second tools with the first and second housing pieces such that the first and second sealing surfaces matingly engage each other, and bonding the mating sealing surfaces to each other.

2. A method according to claim 1, wherein said bonding step is carried out by moving one of said first and second tools relative to the other of said first and second tools in order to produce friction between the mating sealing surfaces of the first and second housing pieces and friction weld the first and second housing pieces to each other.

3. A method according to claim 1, wherein the bonding step is carried out by applying high pressure to the mating sealing surfaces.

4. A method according to claim 1, wherein the bonding step is carried out by applying high frequency energy to the mating sealing surfaces.

5. A method according to claim 4, wherein the high frequency energy is ultrasonic energy.

6. A method according to claim 1, wherein insert pieces of different dimensions are inserted into identical housing pieces in order to produce resonance chambers which differ in cross section.

7. A method according to claim 1, wherein insert pieces of different dimensions are inserted into identical housing pieces in order to produce resonance chambers which differ in length.

8. A method according to claim 1, wherein insert pieces of different dimensions are inserted into identical housing pieces in order to produce resonance chambers which differ in cross section and length.

9. A method according to claim 1, wherein one of the first and second housing pieces is adapted to receive insert pieces of differing dimensions in order to produce resonance chambers which differ in at least one dimension selected from cross section and length.

10. A method according to claim 1, wherein the at least one insert piece is clipped into place in said one of the first and second housing pieces.

11. A plastic intake manifold assembly with a hollow resonance chamber structure comprising first and second plastic housing pieces with mating sealing surfaces bonded to each other to form a housing, and at least one plastic insert piece inserted in one of the first and second housing pieces, said insert piece having a sealing surface mating with said one of the first and second housing pieces to form a resonance chamber cross section interiorly of said housing.

12. A plastic intake manifold assembly according to claim 11, wherein said one of the first and second housing pieces is adapted to receive insert pieces of different dimensions in order to produce resonance chambers which differ in cross section.

13. A plastic intake manifold assembly according to claim 11, wherein said one of the first and second housing pieces is adapted to receive insert pieces of different lengths in order to produce resonance chambers which differ in length.

14. A plastic intake manifold assembly according to claim 11, wherein said one of the first and second housing pieces is adapted to receive insert pieces of different dimensions in order to produce resonance chambers which differ in cross section and length.

* * * * *